Oct. 10, 1933.                H. THOMAS                    1,929,907
                           GASOLINE PURIFIER
                        Filed April 10, 1930         2 Sheets-Sheet 1
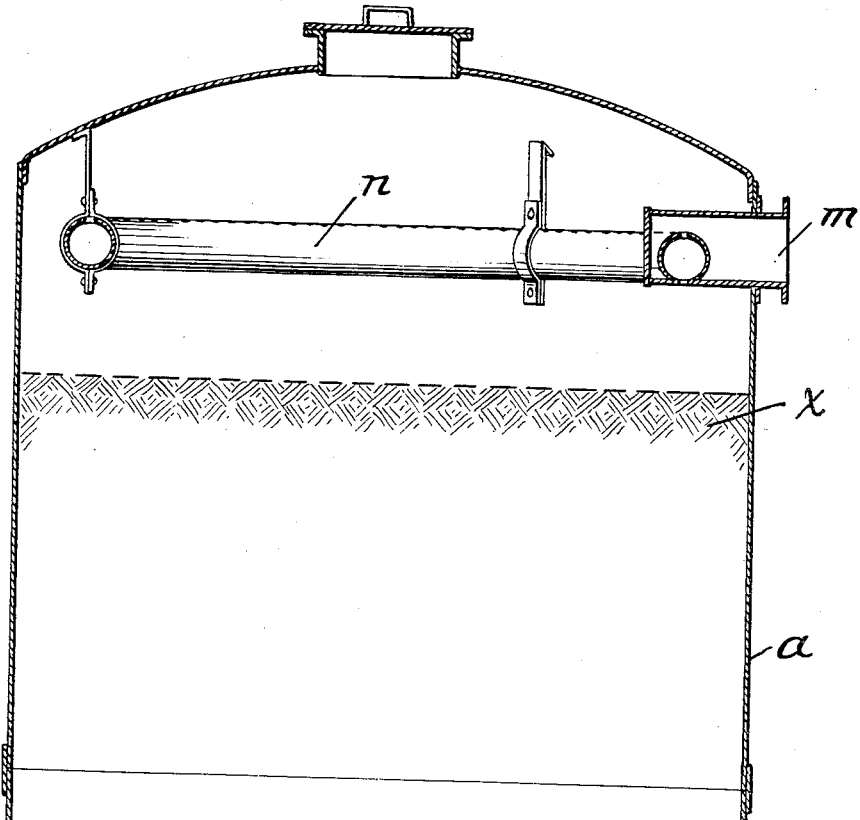
FIG.1.
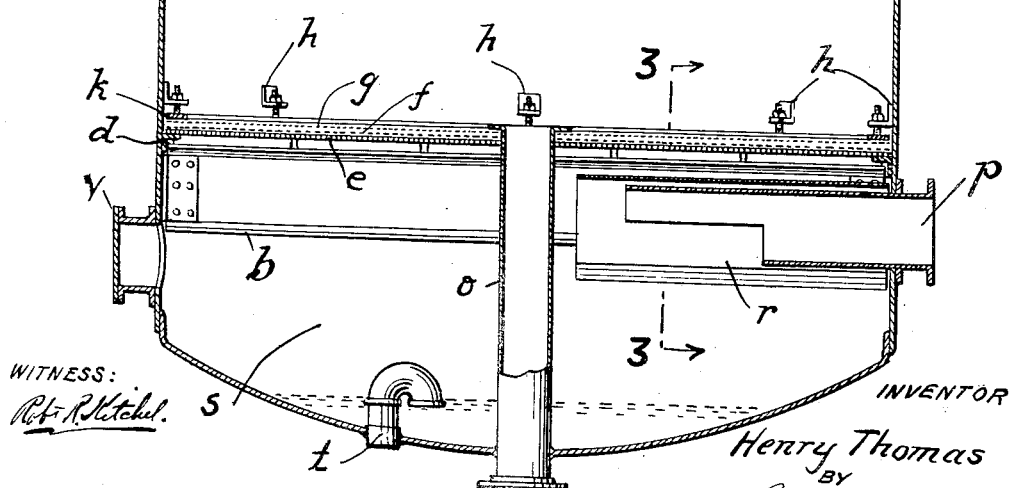
WITNESS:                                              INVENTOR
                                                     Henry Thomas
                                                          BY
                                                     Busser and Harding
                                                         ATTORNEYS.

Oct. 10, 1933.  H. THOMAS  1,929,907
GASOLINE PURIFIER
Filed April 10, 1930   2 Sheets-Sheet 2

WITNESS:

INVENTOR
Henry Thomas
BY
Busser and Harding
ATTORNEYS.

Patented Oct. 10, 1933

1,929,907

UNITED STATES PATENT OFFICE 1,929,907

GASOLINE PURIFIER

Henry Thomas, Ridley Park, Pa., assignor to Sun Oil Company, Philadelphia, Pa., a corporation of New Jersey Application April 10, 1930. Serial No. 443,009

8 Claims. (Cl. 196—96)

This invention relates to purifiers for mineral oil and particularly to that type of purifier, known as a "clay tower", which comprises a container in which is supported a column of fuller's earth or any equivalent filtration material through which the oil passes and wherein certain objectionable products are removed. Such purifiers have been put into successful use in the purification of gasoline, especially gasoline produced by cracking, the gasoline, in vapor phase, flowing downwardly through the filter bed. This purification process is an important part of a complete process for the production of water-white anti-knock gasoline. During the passage of the gasoline vapors through the filter bed, a certain proportion containing objectionable constituents is condensed, the purified vapors being separated from the condensate in the space below the filter bed and being withdrawn separately from said space. A clay tower of this type is shown in the Thomas Patent No. 1,624,692, issued April 12, 1927.

The present invention comprises improvements in the clay tower, the chief of which is deemed to be the novel means for supporting the purifying material while permitting free egress of vapor and liquid therefrom. Another feature of the invention is the means for preventing the entrainment of liquid particles with the purified vapor that is withdrawn from the bottom of the tower. Other minor features of the invention are set forth in the following description and shown in the accompanying drawings, in which—

Fig. 1 is a vertical sectional view of the purifier.

The container or tower $a$ is cylindrical in form and comprises a cylindrical body and a top and bottom welded or otherwise secured thereto so as to form a vapor-tight enclosure.

Extending through the container $a$, some distance above the bottom thereof, and riveted at opposite ends to the inner walls of the container, are a number of horizontal I-beams $b$ in parallel relation. Supported on these I-beams are sections of round bars $c$ on which rests a circular steel plate $e$ through which are drilled a multitude of comparatively large holes. The circumferential edge of the perforated plate $e$ rests on an annular angle bar $d$ secured to the inner wall of the container. The bar $d$ comprises, in fact, a number of arcuate sections, spaced apart to accommodate the ends of the I-beams $b$.

Figure 2:
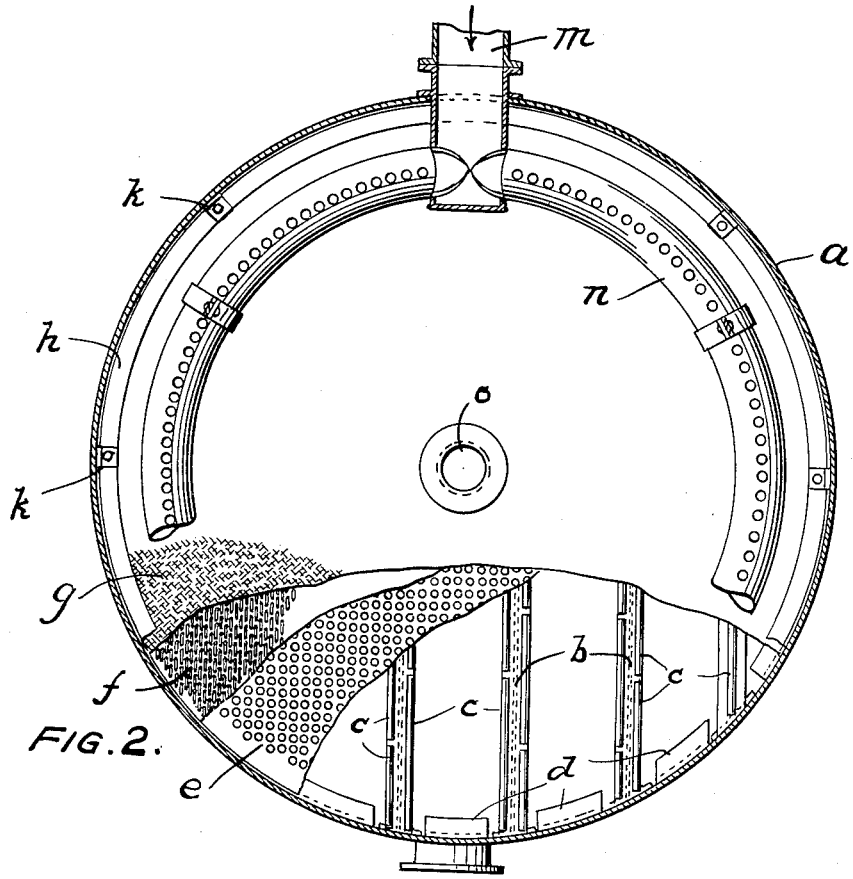
Fig. 2 is a plan view broken away on different horizontal planes.

Supported on the plate $e$ is a screen $f$ composed, preferably, of an aluminum plate provided with smaller perforations than those in plate $e$, the perforations being preferably of slot-like shape (relatively long and narrow) as shown in Fig. 2. These perforations, if drawn to scale, would be considerably smaller than the drawings indicate.

Supported on the screen, or perforated plate, $f$ is a fine woven wire mesh screen $g$, preferably of nickel, which also provides fine apertures for the escape of vapor and liquid.

Just above the screen $g$ are angle pieces $h$ secured to the inner wall of the container. To these angles are welded nuts $i$, through which extend bolts $j$ carrying, or pressing against, a ring $k$ that overlies the plate $e$ and screens $f$ and $g$. By turning the bolts $j$ the said plate and screens may be confined, along their circumferential edges, firmly between the annular angle bars $d$ and the ring $k$.

Extending through the bottom of the container and up through the plates $e$ and $f$ and screen $g$, which are cut away to receive it, is a tube $o$.

The clay bed $x$ fills the larger part of the container above the supporting plate $e$ and screens $f$ and $g$ and fills also the tube $o$, which, during operation, is closed at its bottom. The purifying material, when its efficiency becomes impaired by prolonged use, is removed through tube $o$.

Suspended from the upper part of the container is a circular header $n$ having perforations which preferably open upward. This header communicates with a vapor inflow pipe $m$ extending through the cylindrical wall of the container near its top.

Extending through the cylindrical wall of the container near its bottom into the vapor and liquid separating space $s$ below the clay bed is a vapor outflow pipe $p$. The lower half of this pipe is cut away, adjacent its inner end for a considerable part of its length, to afford an inflow opening of large area and thereby materially reduce the rate of flow of the vapor from the separating space.

Figure 3:
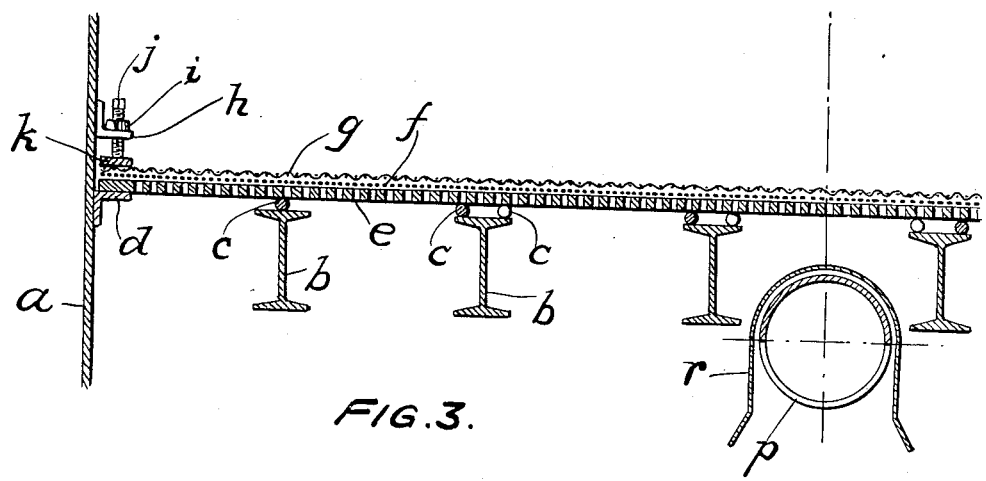
Fig. 3 is an enlarged cross-section on the line 3—3 of Fig. 1.

Enclosing outflow pipe $p$ at top and sides is a hood $r$. This hood extends below pipe $p$ and is provided with outwardly flanged ends, as shown in Fig. 3.

In the bottom of the container is a liquid outflow pipe $t$. At the side of the container and opening into the separating space is a manhole frame *v* provided with a cover.

In operation, the gasoline vapors, entering the pipe *m* and header *n*, are discharged upwardly against the roof of the container and thence flow downward and penetrate the bed of purifying material. By thus distributing the vapor circumferentially and by discharging it upwardly from the circular header, the vapor is evenly distributed throughout the area of the top of the clay bed just prior to its penetration. After flowing through the clay bed, the vapor and such condensate as is desirably formed by reason of the slight reduction in temperature during the purifying process, passes successively through the screens *g* and *f* and the perforated plate *e* into the space *s* in the bottom of the container. No fine solid particles, whatever their nature may be, that are not arrested and held in the clay bed, can pass through the very fine meshes of screen *g* and the very narrow slots in screen *f*. The holes in plate *e* are too large to perform any screening function and are provided merely to allow free passage of vapor and liquid. The sole useful function of the plate *e* is to support screens *f* and *g*, which would, without such support, collapse by reason of the weight of the clay column.

Much of the condensate that passes through the clay bed into the separating space *s* would be entrained in the vapor that flows out through pipe *p* if preventive means were not provided. Such escape of liquid with vapor is prevented, in part, by reducing the speed of vapor outflow at the inlet end of pipe *p* by cutting away the pipe *p* as hereinbefore described. This expedient, however, would not suffice to exclude entrance of such fine or entrained liquid that enters the separating chamber above and on either side of pipe *p*. Such liquid would flow around the pipe and be drawn with the vapor into the mouth of the pipe. The hood *r* prevents this action, and by means of the bottom flanges at the sides of the hood, the liquid is diverted from the mouth of the vapor outflow pipe, and substantially no liquid is carried with the vapor out of the tower.

Having now fully described my invention, what I claim and desire to protect by Letters Patent is:

1. A gasoline purifier comprising an upright container, a relatively thick and strong flat supporting plate, having relatively large perforations, extending across the interior of the container above its bottom and adapted to sustain the weight of a column of purifying material, a screen comprising a relatively weak and thin flat plate having relatively fine perforations and extending across the interior of the container and supported on said plate, and a wire mesh screen extending across the interior of the container and supported on the first named screen.

2. A gasoline purifier comprising an upright container, a series of supporting beams extending across the bottom part of the container, spaced apart bars resting on the supporting beams, a perforated plate resting on said bars, and a screening member resting on said plate.

3. A gasoline purifier comprising an upright container, a series of supporting beams extending across the bottom part of the container, spaced apart bars resting on said beams, arcuate spaced apart bars secured to the inside wall of the container and extending around the container on a level with the bars carried by the beams, a perforated plate resting on all said bars, and a screening member resting on said plate.

4. A gasoline purifier comprising an upright container, a relatively thick and strong supporting plate, having relatively large perforations, extending across the interior of the container above its bottom and adapted to sustain the weight of a column of purifying material, a screening member of comparatively light and weak material and having relatively fine openings and overlying said plate, plate supports underlying said plate and extending across and circumferentially around the container, and clamping means confining said plate and screening member, adjacent their circumferences, in position on the plate supports.

5. A gasoline purifier comprising supporting means for a column of purifying material and extending across the container above its bottom, a vapor inlet in the upper part of the container, and a vapor outlet pipe extending laterally into a space within the lower part of the container, the lower part of said outlet pipe being cut away for a substantial distance near its inner vapor admission end.

6. A gasoline purifier comprising supporting means for a column of purifying material and extending across the container above its bottom, a vapor inlet in the upper part of the container, a vapor outlet pipe extending laterally into a space within the lower part of the container, and a hood enclosing the top and sides of the vapor outlet pipe.

7. A gasoline purifier comprising supporting means for a column of purifying material and extending across the container above its bottom, a vapor inlet in the upper part of the container, a vapor outlet pipe extending laterally into a space within the lower part of the container, and a hood enclosing the top and sides of the vapor outlet pipe, the sides of the hood diverging outward at its bottom.

8. A gasoline purifier comprising supporting means for a column of purifying material and extending across the container above its bottom, a vapor inlet in the upper part of the container, a vapor outlet pipe extending laterally into a space within the lower part of the container, the lower part of said outlet pipe being cut away for a substantial distance near its inner vapor admission end, and a hood enclosing the top and sides of the vapor outlet pipe; the specified arrangement of vapor outflow pipe and hood decreasing the rate of flow of vapor into the mouth of the inlet pipe and preventing direct access to said outflow pipe of liquid admitted to said space in the immediate vicinity of said pipe.

HENRY THOMAS.